US011335063B2

(12) United States Patent
Lee et al.

(10) Patent No.: US 11,335,063 B2
(45) Date of Patent: May 17, 2022

(54) MULTIPLE MAPS FOR 3D OBJECT SCANNING AND RECONSTRUCTION

(71) Applicant: VanGogh Imaging, Inc., McLean, VA (US)

(72) Inventors: Ken Lee, Fairfax, VA (US); Jun Yin, McLean, VA (US); Craig Cambias, Silver Spring, MD (US)

(73) Assignee: VanGogh Imaging, Inc., McLean, VA (US)

( * ) Notice: Subject to any disclaimer, the term of this patent is extended or adjusted under 35 U.S.C. 154(b) by 0 days.

(21) Appl. No.: 17/138,253

(22) Filed: Dec. 30, 2020

(65) Prior Publication Data

US 2021/0209849 A1    Jul. 8, 2021

Related U.S. Application Data

(60) Provisional application No. 62/956,757, filed on Jan. 3, 2020.

(51) Int. Cl.
*G06T 17/20* (2006.01)
*G06T 7/536* (2017.01)

(52) U.S. Cl.
CPC ............. *G06T 17/20* (2013.01); *G06T 7/536* (2017.01); *G06T 2207/10024* (2013.01); *G06T 2207/10028* (2013.01)

(58) Field of Classification Search
None
See application file for complete search history.

(56) References Cited

U.S. PATENT DOCUMENTS

| 5,675,326 A | 10/1997 | Juds et al. |
|---|---|---|
| 6,259,815 B1 | 7/2001 | Anderson et al. |

(Continued)

FOREIGN PATENT DOCUMENTS

| EP | 1308902 A2 | 5/2003 |
|---|---|---|
| KR | 10-1054736 B1 | 8/2011 |

(Continued)

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.

(Continued)

*Primary Examiner* — Frank S Chen
(74) *Attorney, Agent, or Firm* — Proskauer Rose LLP

(57) ABSTRACT

Described herein are methods and systems for generating multiple maps during object scanning for 3D object reconstruction. A sensor device captures RGB images and depth maps of objects in a scene. A computing device receives the RGB images and the depth maps from the sensor device. The computing device creates a first map using at least a portion of the depth maps, a second map using at least a portion of the depth maps, and a third map using at least a portion of the depth maps. The computing device finds key point matches among the first map, the second map, and the third map. The computing device performs bundle adjustment on the first map, the second map, and the third map using the matched key points to generate a final map. The computing device generates a 3D mesh of the object using the final map.

18 Claims, 12 Drawing Sheets

(56) References Cited

U.S. PATENT DOCUMENTS

| | | |
|---|---|---|
| 6,275,235 B1 | 8/2001 | Morgan, III |
| 6,525,722 B1 | 2/2003 | Deering |
| 6,525,725 B1 | 2/2003 | Deering |
| 7,248,257 B2 | 7/2007 | Elber |
| 7,420,555 B1 | 9/2008 | Lee |
| 7,657,081 B2 | 2/2010 | Blais et al. |
| 8,209,144 B1 | 6/2012 | Anguelov et al. |
| 8,542,233 B2 | 9/2013 | Brown |
| 8,766,979 B2 | 7/2014 | Lee et al. |
| 8,942,917 B2 | 1/2015 | Chrysanthakopoulos |
| 8,995,756 B2 | 3/2015 | Lee et al. |
| 9,041,711 B1 | 5/2015 | Hsu |
| 9,104,908 B1 | 8/2015 | Rogers et al. |
| 9,171,402 B1 | 10/2015 | Allen et al. |
| 9,607,388 B2 | 5/2017 | Lin et al. |
| 9,710,960 B2 | 7/2017 | Hou |
| 9,886,530 B2 | 2/2018 | Mehr et al. |
| 9,978,177 B2 | 5/2018 | Mehr et al. |
| 10,467,792 B1 | 11/2019 | Roche et al. |
| 2005/0068317 A1 | 3/2005 | Amakai |
| 2005/0128201 A1 | 6/2005 | Warner et al. |
| 2005/0253924 A1 | 11/2005 | Mashitani |
| 2006/0050952 A1 | 3/2006 | Blais et al. |
| 2006/0170695 A1 | 8/2006 | Zhou et al. |
| 2006/0277454 A1 | 12/2006 | Chen |
| 2007/0075997 A1 | 4/2007 | Rohaly et al. |
| 2008/0180448 A1 | 7/2008 | Anguelov et al. |
| 2008/0310757 A1 | 12/2008 | Wolberg et al. |
| 2009/0232353 A1 | 9/2009 | Sundaresan et al. |
| 2010/0111370 A1 | 5/2010 | Black et al. |
| 2010/0198563 A1 | 8/2010 | Plewe |
| 2010/0209013 A1 | 8/2010 | Minear et al. |
| 2010/0302247 A1 | 12/2010 | Perez et al. |
| 2011/0052043 A1 | 3/2011 | Hyung et al. |
| 2011/0074929 A1 | 3/2011 | Hebert et al. |
| 2012/0056800 A1 | 3/2012 | Williams et al. |
| 2012/0063672 A1 | 3/2012 | Gordon et al. |
| 2012/0098937 A1 | 4/2012 | Sajadi et al. |
| 2012/0130762 A1 | 5/2012 | Gale et al. |
| 2012/0194516 A1 | 8/2012 | Newcombe et al. |
| 2012/0194517 A1 | 8/2012 | Izadi et al. |
| 2012/0306876 A1 | 12/2012 | Shotton et al. |
| 2013/0069940 A1 | 3/2013 | Sun et al. |
| 2013/0123801 A1 | 5/2013 | Umasuthan et al. |
| 2013/0156262 A1 | 6/2013 | Taguchi et al. |
| 2013/0201104 A1 | 8/2013 | Ptucha et al. |
| 2013/0201105 A1 | 8/2013 | Ptucha et al. |
| 2013/0208955 A1 | 8/2013 | Zhao et al. |
| 2014/0160115 A1 | 6/2014 | Keitler et al. |
| 2014/0176677 A1 | 6/2014 | Valkenburg et al. |
| 2014/0206443 A1 | 7/2014 | Sharp et al. |
| 2014/0240464 A1 | 8/2014 | Lee |
| 2014/0241617 A1 | 8/2014 | Shotton et al. |
| 2014/0270484 A1 | 9/2014 | Chandraker et al. |
| 2014/0321702 A1 | 10/2014 | Schmalstieg |
| 2015/0009214 A1 | 1/2015 | Lee et al. |
| 2015/0045923 A1 | 2/2015 | Chang et al. |
| 2015/0142394 A1 | 5/2015 | Mehr et al. |
| 2015/0213572 A1 | 7/2015 | Loss |
| 2015/0234477 A1 | 8/2015 | Abovitz et al. |
| 2015/0262405 A1 | 9/2015 | Black et al. |
| 2015/0269715 A1 | 9/2015 | Jeong et al. |
| 2015/0279118 A1 | 10/2015 | Dou et al. |
| 2015/0301592 A1 | 10/2015 | Miller |
| 2015/0325044 A1 | 11/2015 | Lebovitz |
| 2015/0371440 A1 | 12/2015 | Pirchheim et al. |
| 2015/0381968 A1* | 12/2015 | Arora .................. G06T 17/00 348/47 |
| 2016/0026253 A1 | 1/2016 | Bradski et al. |
| 2016/0071284 A1* | 3/2016 | Kontschieder ......... G06N 20/00 382/107 |
| 2016/0071318 A1 | 3/2016 | Lee et al. |
| 2016/0171765 A1 | 6/2016 | Mehr |
| 2016/0173842 A1 | 6/2016 | De La Cruz et al. |
| 2016/0358382 A1 | 12/2016 | Lee et al. |
| 2017/0053447 A1 | 2/2017 | Chen et al. |
| 2017/0054954 A1 | 2/2017 | Keitler et al. |
| 2017/0054965 A1 | 2/2017 | Raab et al. |
| 2017/0148155 A1* | 5/2017 | Wei .................. H04N 9/04 |
| 2017/0221263 A1 | 8/2017 | Wei et al. |
| 2017/0243397 A1 | 8/2017 | Hou et al. |
| 2017/0278293 A1 | 9/2017 | Hsu |
| 2017/0316597 A1 | 11/2017 | Ceylan et al. |
| 2017/0337726 A1 | 11/2017 | Bui et al. |
| 2018/0005015 A1 | 1/2018 | Hou et al. |
| 2018/0025529 A1 | 1/2018 | Wu et al. |
| 2018/0114363 A1 | 4/2018 | Rosenbaum |
| 2018/0144535 A1 | 5/2018 | Ford et al. |
| 2018/0288387 A1 | 10/2018 | Somanath et al. |
| 2018/0300937 A1 | 10/2018 | Chien et al. |
| 2019/0208007 A1 | 7/2019 | Khalid |
| 2019/0244412 A1 | 8/2019 | Yago Vicente et al. |
| 2019/0251728 A1 | 8/2019 | Stoyles et al. |
| 2020/0086487 A1 | 3/2020 | Johnson et al. |
| 2020/0105013 A1 | 4/2020 | Chen |

FOREIGN PATENT DOCUMENTS

| | | |
|---|---|---|
| KR | 10-2011-0116671 A | 10/2011 |
| WO | 2006027339 A2 | 3/2006 |

OTHER PUBLICATIONS

Melax, S., "A Simple, Fast, and Effective Polygon Reduction Algorithm," Game Developer, Nov. 1998, pp. 44-49.

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

Zadi, S. et al., "KinectFusion: Real-time 3D Reconstruction and Interaction Using a Moving Depth Camera," UIST '11, Oct. 16-19, 2011, 10 pages.

Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 3-12, 2010, 14 pages.

Biegelbauer, Georg et al., "Model-based 3D object detection—Efficient approach using superquadrics," Machine Vision and Applications, Jun. 2010, vol. 21, Issue 4, pp. 497-516.

Kanezaki, Asako et al., "High-speed 3D Object Recognition Using Additive Features in a Linear Subspace," 2010 IEEE International Conference on Robotics and Automation, Anchorage Convention District, May 3-8, 2010, pp. 3128-3134.

International Search Report and Written Opinion from PCT patent application No. PCT/US13/062292, dated Jan. 28, 2014, 10 pages.

International Search Report and Written Opinion from PCT patent application No. PCT/US14/045591, dated Nov. 5, 2014, 9 pages.

Sumner, R. et al., "Embedded Deformation for Shape Manipulation," Applied Geometry Group, ETH Zurich, SIGGRAPH 2007, 7 pages.

Rosten, Edward, et al., "Faster and better: a machine learning approach to corner detection," arXiv:08102.2434v1 [cs.CV], Oct. 14, 2008, available at https://arxiv.org/pdf/0810.2434.pdf, 35 pages.

Kim, Young Min, et al., "Guided Real-Time Scanning of Indoor Objects," Computer Graphics Forum, vol. 32, No. 7 (2013), 10 pages.

Rusinkewicz, Szymon, et al., "Real-time 3D model acquisition," ACM Transactions on Graphics (TOG) 21.3 (2002), pp. 438-446.

European Search Report from European patent application No. EP 15839160, dated Feb. 19, 2018, 8 pages.

Liu, Song, et al., "Creating Simplified 3D Models with High Quality Textures," arXiv:1602.06645v1 [cs.GR], Feb. 22, 2016, 9 pages.

Stoll, C., et al., "Template Deformation for Point Cloud Filtering," Eurographics Symposium on Point-Based Graphics (2006), 9 pages.

Allen, Brett, et al., "The space of human body shapes: reconstruction and parameterization from range scans," ACM Transactions on Graphics (TOG), vol. 22, Issue 3, Jul. 2003, pp. 587-594.

(56) References Cited

OTHER PUBLICATIONS

International Search Report and Written Opinion from PCT patent application No. PCT/US15/49175, dated Feb. 19, 2016, 14 pages.
Harris, Chris & Mike Stephens, "A Combined Corner and Edge Detector," Plessey Research Roke Manor, U.K. (1988), pp. 147-151.
Bay, Herbert, et al., "Speeded-Up Robust Features (SURF)," Computer Vision and Image Understanding 110 (2008), pp. 346-359.
Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.
Lowe, David G., "Distinctive Image Features from Scale-Invariant Keypoints," International Journal of Computer Vision, vol. 60, Issue 2, Nov. 2004, pp. 91-110.
Kaess, Michael, et al., "iSAM: Incremental Smoothing and Mapping," IEEE Transactions on Robotics, Manuscript, Sep. 7, 2008, 14 pages.
Kummerle, Rainer, et al., "g2o: A General Framework for Graph Optimization," 2011 IEEE International Conference an Robotics and Automation, May 9-13, 2011, Shanghai, China, 7 pages.

\* cited by examiner

MULTIPLE MAPS FOR 3D OBJECT SCANNING AND RECONSTRUCTION

RELATED APPLICATIONS

This application claims priority to U.S. Provisional Patent Application No. 62/956,757, filed on Jan. 3, 2020, the entirety of which is incorporated herein by reference.

TECHNICAL FIELD

This subject matter of this application relates generally to methods and apparatuses, including computer program products, for multiple maps for 3D object scanning and reconstruction.

BACKGROUND

Generally, current approaches to 3D object reconstruction utilize limited "single map" techniques to provide a variety of high-level 3D model generation algorithms. However, with these techniques, it can be difficult for users to finish scanning objects due to, e.g., unreliable tracking. In "single map" reconstruction, every frame has to determine a location in the single map during scanning. When one frame loses the location information, the subsequent frames are not added into the object reconstruction process—which causes a failure to generate the corresponding 3D model.

SUMMARY

Therefore, what is needed are systems and methods that enable a multi-map-based method for 3D object reconstruction which takes into account both accuracy and efficiency. The techniques described herein advantageously provide for tolerances in tracking loss and also result in substantial improvements for the user experience in scanning objects. For example, during scanning, the systems and methods generate multiple maps instead of only one (as in the prior systems described above). Each of these multiple maps contains its own frames to contribute to the partially scanned object, and each map has exactly the same structure containing 3D model information. Furthermore, each map is able to connect to other map(s) that are generated. This beneficially allows a user to continue scanning the object (and/or scene) without going back to the previous map and re-localizing—even when the tracking is lost. All the user has to do then is to make sure the camera field of view (FoV) has covered the entire area that needs to be scanned. As a result, these innovative techniques improve both speed and robustness of the scanning process.

The invention, in one aspect, features a system for generating multiple maps during object scanning for 3D object reconstruction. The system includes a sensor device that captures one or more RGB images and one or more depth maps of one or more objects in a scene. The system includes a computing device coupled to the sensor device, the computing device comprising a memory that stores computer-executable instructions and a processor that executes the instructions. The computing device receives the one or more RGB images and the one or more depth maps from the sensor device. The computing device creates a first map using at least a portion of the one or more depth maps. The computing device creates a second map using at least a portion of the one or more depth maps. The computing device creates a third map using at least a portion of the one or more depth maps. The computing device finds key point matches among the first map, the second map, and the third map. The computing device performs bundle adjustment on the first map, the second map, and the third map using the matched key points to generate a final map. The computing device generates a 3D mesh of the object using the final map.

The invention, in another aspect, features a computerized method of generating multiple maps during object scanning for 3D object reconstruction. A sensor device captures one or more RGB images and one or more depth maps of one or more objects in a scene. A computing device receives, from the sensor device, the one or more RGB images and the one or more depth maps. The computing device creates a first map using at least a portion of the one or more depth maps. The computing device creates a second map using at least a portion of the one or more depth maps. The computing device creates a third map using at least a portion of the one or more depth maps. The computing device finds key point matches among the first map, the second map, and the third map. The computing device performs bundle adjustment on the first map, the second map, and the third map using the matched key points to generate a final map. The computing device generates a 3D mesh of the object using the final map.

Any of the above aspects can include one or more of the following features. In some embodiments, creating a first map using at least a portion of the one or more depth maps comprises, for each depth map: locating at least one of the one or more objects in the depth map; identifying one or more key points on the located one or more objects; and combining the identified key points to generate the first map. In some embodiments, the portion of the one or more depth maps used to create the first map comprise a view of the one or more objects from a first perspective.

In some embodiments, creating a second map using at least a portion of the one or more depth maps comprises, for each depth map: locating at least one of the one or more objects in the depth map; identifying one or more key points on the located one or more objects; and combining the identified key points to generate the second map. In some embodiments, the portion of the one or more depth maps used to create the second map comprise a view of the one or more objects from a second perspective. In some embodiments, the second perspective is different from the first perspective.

In some embodiments, creating a third map using at least a portion of the one or more depth maps comprises, for each depth map: locating at least one of the one or more objects in the depth map; identifying one or more key points on the located one or more objects; and combining the identified key points to generate the third map. In some embodiments, the portion of the one or more depth maps used to create the third map comprise a view of the one or more objects from a third perspective. In some embodiments, the third perspective is different from the first perspective and the second perspective.

In some embodiments, at least one of the identified key points in the first map overlaps with at least one of the identified key points in the third map. In some embodiments, at least one of the identified key points in the second map overlaps with at least one of the identified key points in the third map. In some embodiments, at least one of the identified key points in the first map overlaps with at least one of the identified key points in the third map.

In some embodiments, finding key point matches among the first map, the second map, and the third map comprises one or more of: determining that a key point from the first map overlaps with a key point from the second map and identifying the overlapping key points as a key point match;

determining that a key point from the second map overlaps with a key point from the third map and identifying the overlapping key points as a key point match; and determining that a key point from the first map overlaps with a key point from the third map and identifying the overlapping key points as a key point match. In some embodiments, the final map comprises a plurality of bundle-adjusted matched key points from the first map, the second map, and the third map.

In some embodiments, the 3D mesh is generated using a Marching Cube algorithm applied to at least a portion of the final map. In some embodiments, the one or more objects in the scene are stationary and the sensor device is moving, as the sensor device captures the one or more RGB images and the one or more depth maps. In some embodiments, the one or more objects in the scene are moving and the sensor device is stationary, as the sensor device captures the one or more RGB images and the one or more depth maps. In some embodiments, the one or more objects in the scene are moving and the sensor device is moving, as the sensor device captures the one or more RGB images and the one or more depth maps.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
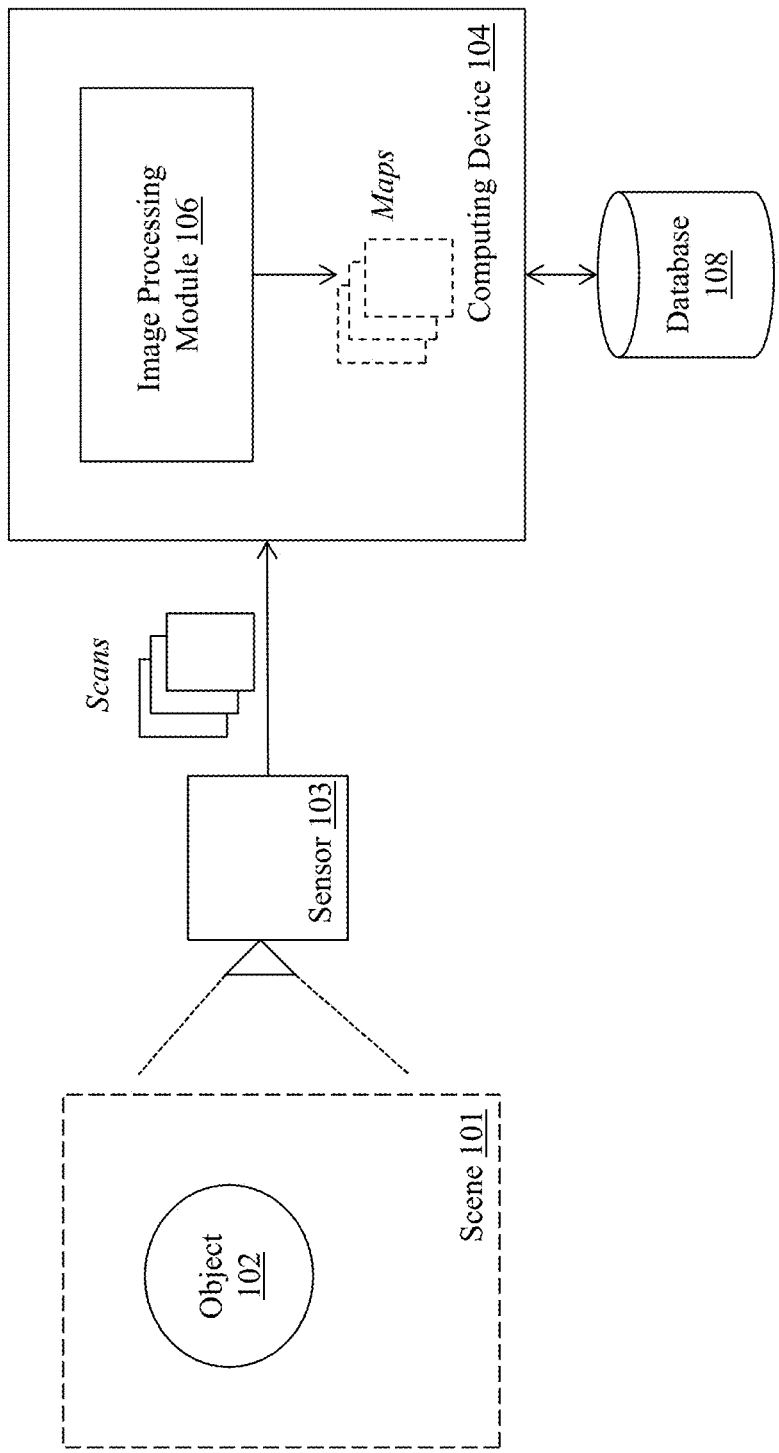
FIG. 1 is a block diagram of a system for generating multiple maps during object scanning for 3D object reconstruction.

FIG. 1 is a block diagram of a system 100 for generating multiple maps during object scanning. Certain embodiments of the systems and methods described in this application utilize:

the dynamic 3D modeling techniques as described in U.S. patent application Ser. No. 14/849,172, titled "Real-Time Dynamic Three-Dimensional Adaptive Object Recognition and Model Reconstruction;"

the 3D photogrammetry techniques as described in U.S. Pat. No. 10,192,347, titled "3D Photogrammetry;"

the color optimization techniques as described in U.S. Provisional Patent Application No. 62/421,208, titled "Color Optimization for Texturing 3D Models;"

the 3D geometry reconstruction techniques as described in U.S. patent application Ser. No. 16/118,894, titled "Enhancing Depth Sensor-Based 3D Geometry Reconstruction with Photogrammetry;"

the object tracking techniques as described in U.S. patent application Ser. No. 16/123,256, titled "Combining Sparse Two-Dimensional (2D) and Dense Three-Dimensional (3D) Tracking;" and the 3D object reconstruction technology as described in U.S. Provisional Patent Application No. 62/652,057, titled "Enhancing 3D Object Reconstruction using Dynamic Fusion and Hand Removal."

Each of the above-referenced patents and patent applications is incorporated by reference herein in its entirety. The methods and systems described in the above patents and patent applications, and in the present patent application, are available by implementing the Starry Night SDK, available from VanGogh Imaging, Inc. of McLean, Va.

The system 100 includes a sensor 103 coupled to a computing device 104. The computing device 104 includes an image processing module 106. In some embodiments, the computing device can also be coupled to a data storage module (database 108), e.g., used for storing certain 3D models, color images, maps, and other data as described herein. The sensor 103 is positioned to capture scans (e.g., color (RGB) images and/or depth maps) of a scene 101 which includes one or more physical objects (e.g., object 102). In some embodiments, a user manually rotates and moves the object 102 in the scene 101 so that the sensor 103 captures a plurality of scans of the object from different angles and/or sides; in some embodiments, the user's hand is captured in the scans along with the object.

Exemplary sensors that can be used in the system 100 include, but are not limited to, time-of-flight (ToF) sensors that are capable of capturing depth information of the pixels along with the images of a real-world object and/or scene to collect data on its position, location, and appearance. Other types of sensors include 3D scanners, digital cameras, and other types of devices. In some embodiments, the sensor 103 is embedded into the computing device 104, such as a camera in a smartphone, for example. An exemplary sensor 103 can be a 3D scanner built from combining a depth camera and a high-resolution RGB camera. The cameras can be calibrated so their data can be registered to each other. In one embodiment, the sensor 103 includes a Sony DepthsSense™ ToF sensor coupled to, e.g., a computing device such as a mobile device with an embedded camera. It should be appreciated that other combinations of these devices or other devices can be used to perform the techniques described herein.

The computing device 104 receives images (also called scans) of the scene 101 from the sensor 103 and processes the images to generate 3D models of objects (e.g., object 102) represented in the scene 101. The computing device 104 can take on many forms, including both mobile and non-mobile forms. Exemplary computing devices include, but are not limited to, a laptop computer, a desktop computer, a tablet computer, a smart phone, an internet of things (IoT) device, augmented reality (AR)/virtual reality (VR) devices (e.g., glasses, headset apparatuses, and so forth), or the like. In some embodiments, the sensor 203 and computing device 104 can be embedded in a larger mobile structure such as a robot or unmanned aerial vehicle (UAV). It should be appreciated that other computing devices can be used without departing from the scope of the invention. The computing device 104 includes network-interface components to connect to a communications network (not shown). In some embodiments, the network-interface components include components to connect to a wireless network, such as a Wi-Fi or cellular network, in order to access a wider network, such as the Internet.

The computing device 104 includes an image processing module 106 configured to receive images captured by the sensor 103 and analyze the images in a variety of ways, including detecting the position and location of objects represented in the images and generating 3D models of objects in the images. The image processing module 106 is a hardware and/or software module that resides on the computing device 104 to perform functions associated with analyzing images capture by the scanner, including the generation of 3D models (e.g., .OBJ files) based upon objects in the images. In some embodiments, the functionality of the image processing module 106 is distributed among a plurality of computing devices. In some embodiments, the image processing module 106 operates in conjunction with other modules that are either also located on the computing device 104 or on other computing devices coupled to the computing device 104. It should be appreciated that any number of computing devices, arranged in a variety of architectures, resources, and configurations (e.g., cluster computing, virtual computing, cloud computing) can be used without departing from the scope of the invention. An exemplary image processing module 106 is the Starry Night SDK, available from VanGogh Imaging, Inc. of McLean, Va.

It should be appreciated that in one embodiment, the image processing module 106 comprises specialized hardware (such as a processor or system-on-chip) that is embedded into, e.g., a circuit board or other similar component of another device. In this embodiment, the image processing module 106 is specifically programmed with the image processing and modeling software functionality described below.

Figure 2:
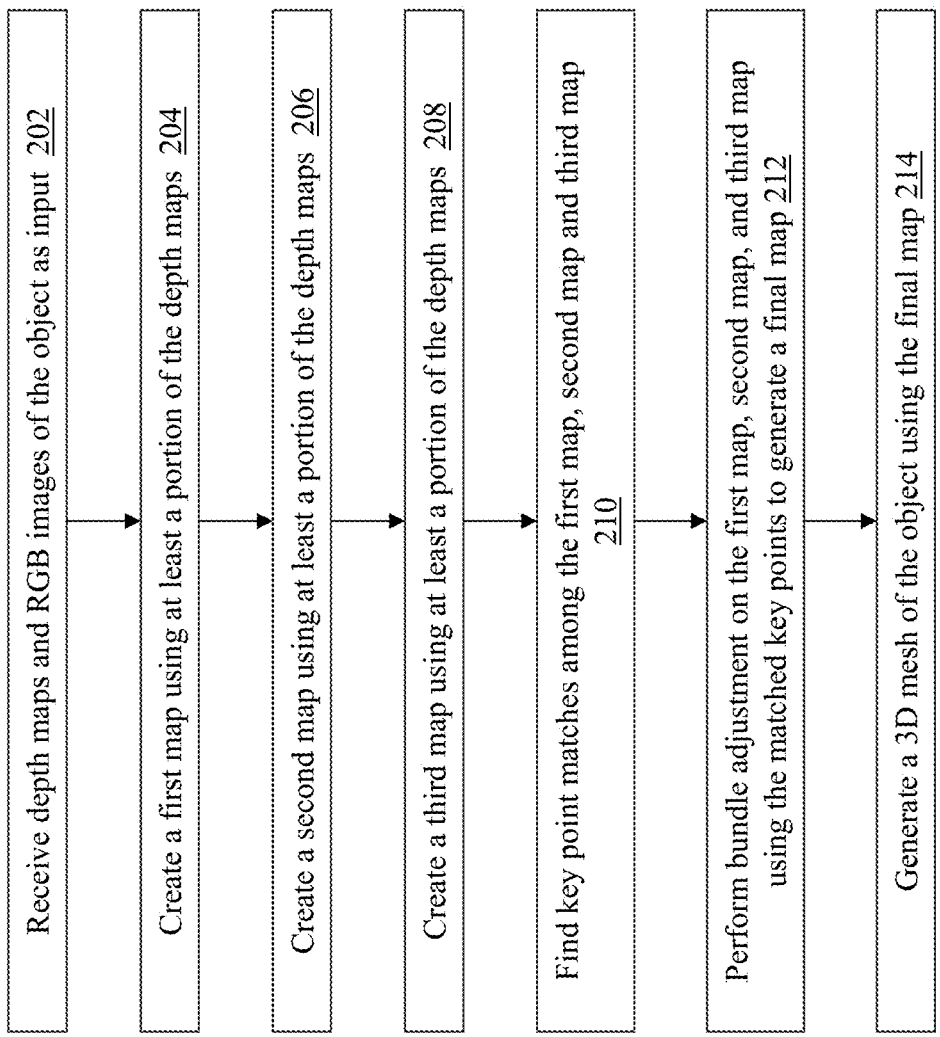
FIG. 2 is a flow diagram of a computerized method of generating multiple maps during object scanning, using the system of FIG. 1.
Figure 3:
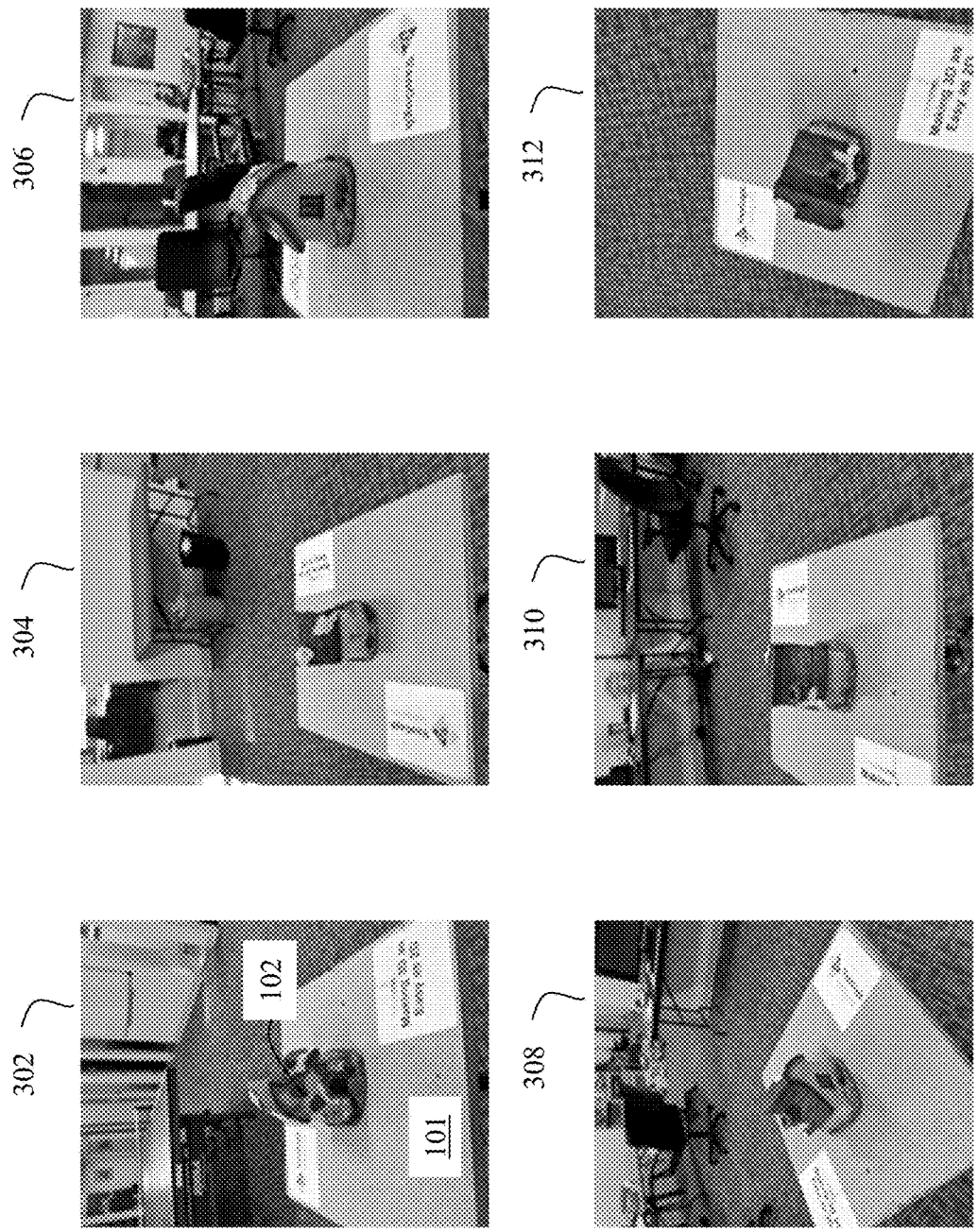
FIG. 3 depicts a plurality of scans of an object in a scene from different angles and perspectives where only the sensor device moves in relation to the object.

FIG. 2 is a flow diagram of a computerized method of generating multiple maps during object scanning, using the system 100 of FIG. 1. The sensor device 103 captures one or more scans of the object 102 in the scene 101. In some embodiments, the scans comprise one or more depth map(s) (also called frames) and corresponding RGB image(s) of the object 102 in the scene. In some embodiments, the sensor device 103 can stream the depth map(s) and RGB image(s) over a communications network, such as a LAN, WAN, Internet, etc. (not shown) to the image processing module 106 of computing device 104. As shown in FIG. 3, a user scans the object 102 (e.g., a porcelain house) in the scene 101 from different angles and perspectives (e.g., scans 302-312) only by moving the sensor device 103 (and not moving the object 102 at all).

Figure 4:
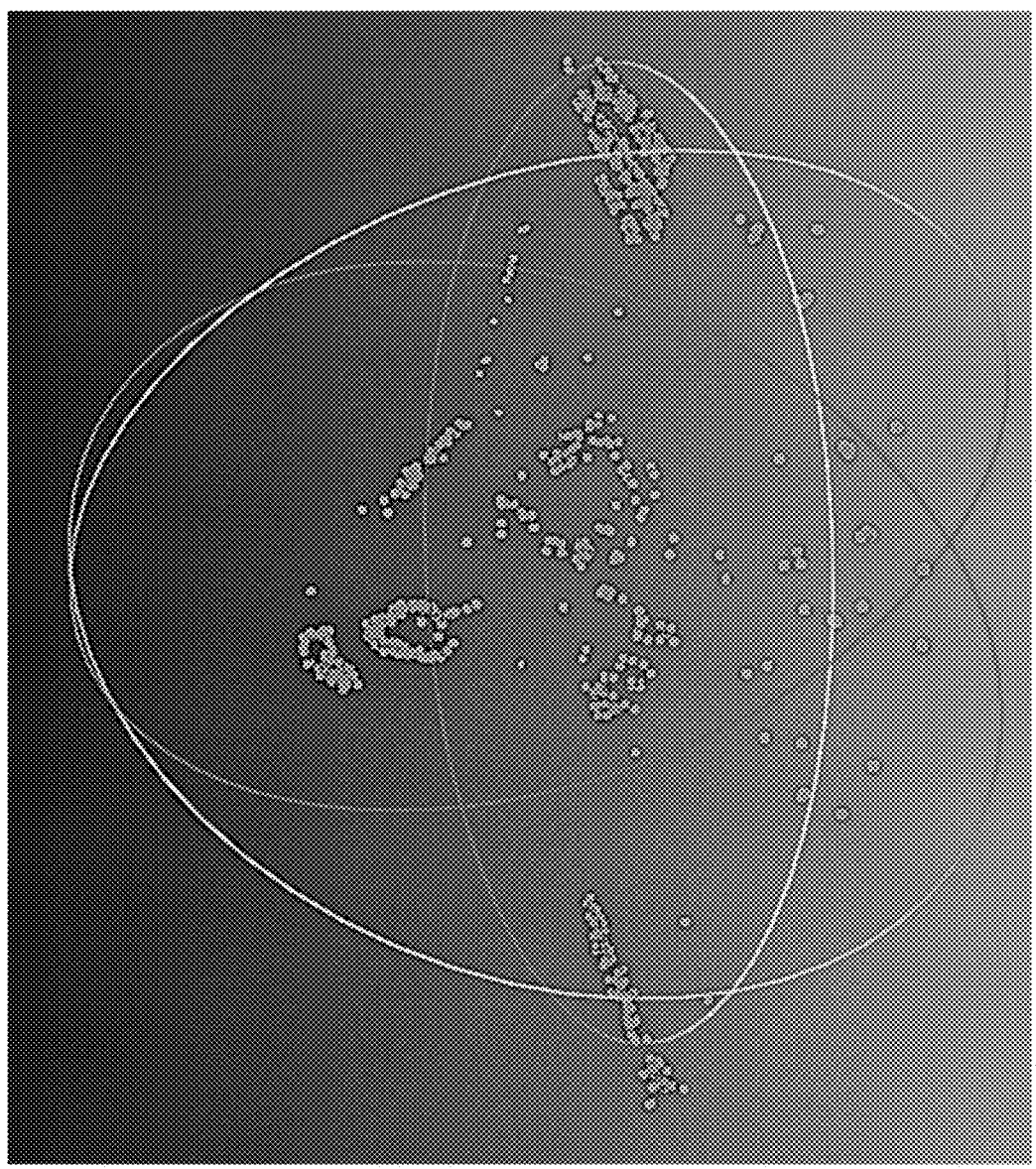
FIG. 4 depicts a first map generated from a plurality of scans of the object.

The image processing module 106 receives (202) the depth map(s) and RGB image(s). The image processing module 106 starts to reconstruct the scanned object and creates (202) a first map. The image processing module 106 adds frames into the first map—as shown in FIG. 4, the first map comprises certain key points on the object and select key frames from the input. For each frame, the image processing module 106 performs a loop to process the frame to track the object and then update the first map based upon the tracking. For example, for each frame, the image processing module 106 can locate the object in the frame, identify one or more key points on the object, and add the identified key points to the first map. In this first map, it should be appreciated that only part of the object has been covered by scanning.

Figure 5:
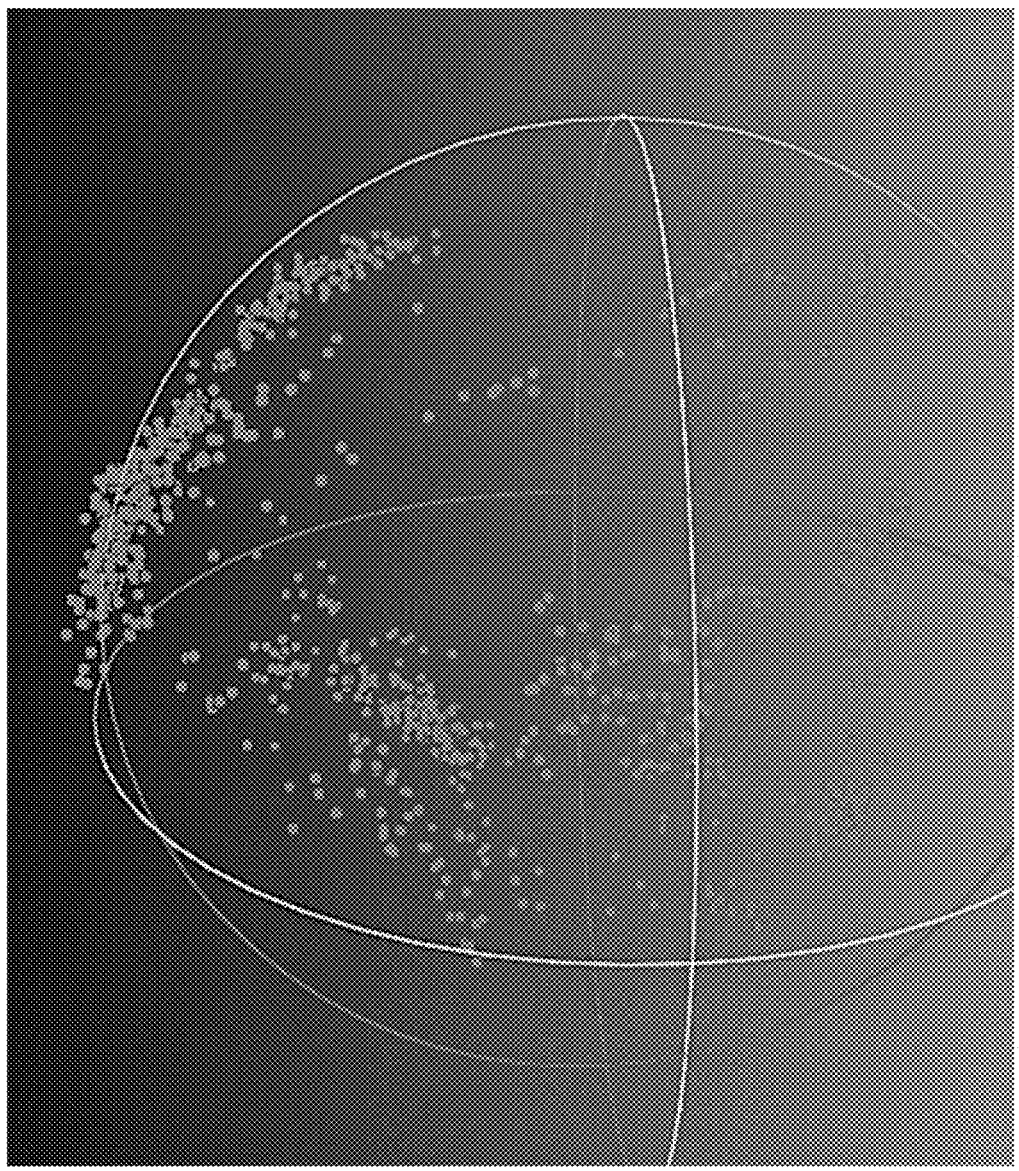
FIG. 5 depicts a second map generated from a plurality of scans of the object.

Next, the image processing module 106 creates (204) a second map and adds new frames into the second map— where the frames added to the second map are from a different side and/or perspective of the object (e.g., the opposite side) than the frames added to the first map. Similar to creating the first map, the image processing module 106 performs a loop to receive each frame, track the object, and then update the second map based upon the tracking. As shown in FIG. 5, the second map comprises certain key points on the object—the second map is similar to the first map, in that only part of the object has been covered by scanning.

Figure 6:
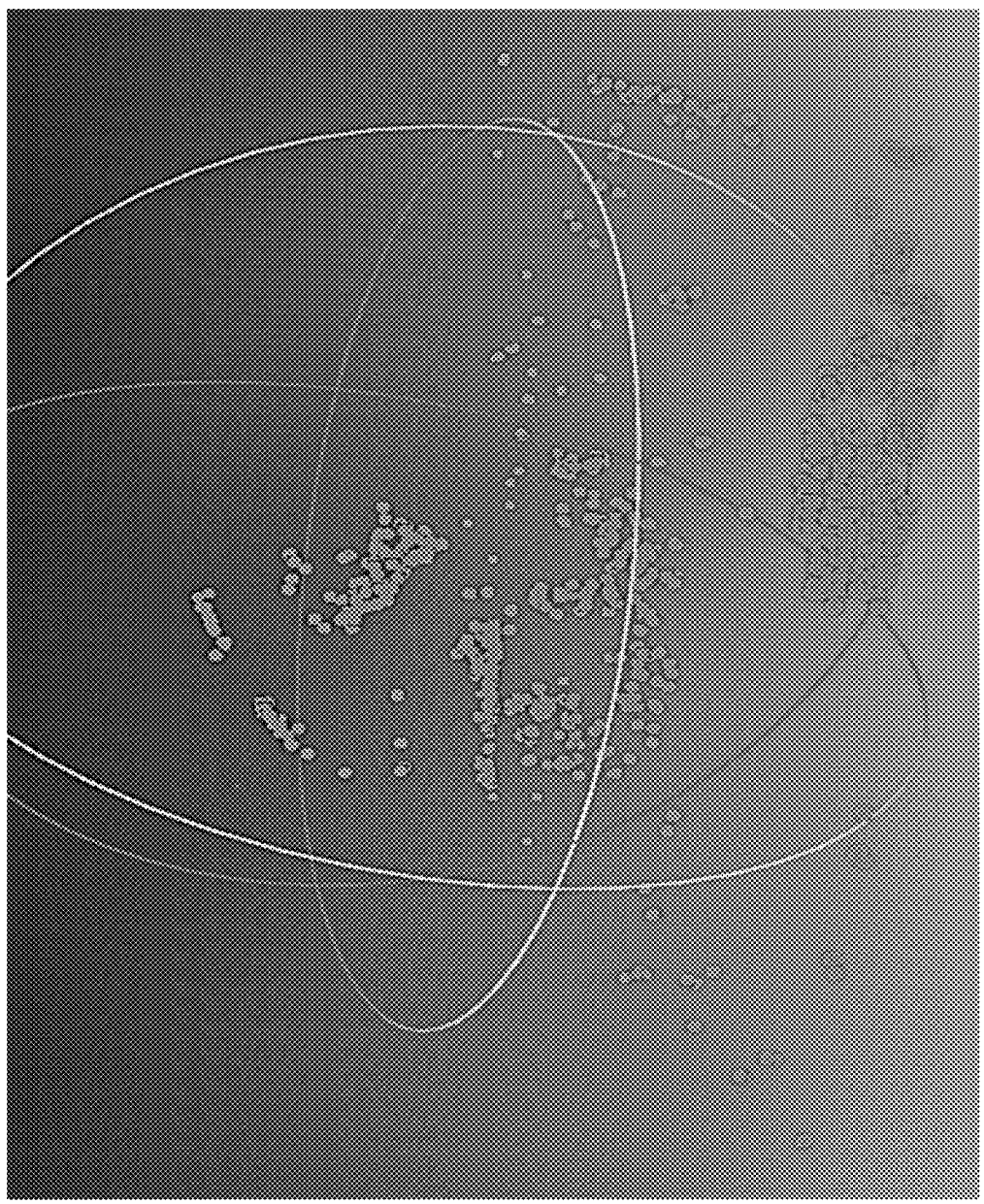
FIG. 6 depicts a third map generated from a plurality of scans of the object.

The image processing module 106 then creates (206) a third map to cover any areas missing from the first map and the second map, and adds new frames into the third map. Similar to creating the first map and the second map, the image processing module 106 performs a loop to receive each frame, track the object, and then update the third map based upon the tracking. FIG. 6 depicts the third map comprising certain key points on the object. It should be appreciated that upon completion of the third map, each of the three maps are independent of each other but also have some overlap in key points between them.

Once all three maps are created as described above, the image processing module 106 finds (208) key point matches among the three maps. Each map has a set of key points, and every two maps have some shared key points. In order to find key point matches, the image processing module 106 can apply 2D/RGB feature matching and 3D/point based matching algorithms. In some embodiments, ORB descriptor distance and point normal are used as criteria to calculate the similarity among the matched key points.

Figure 7:
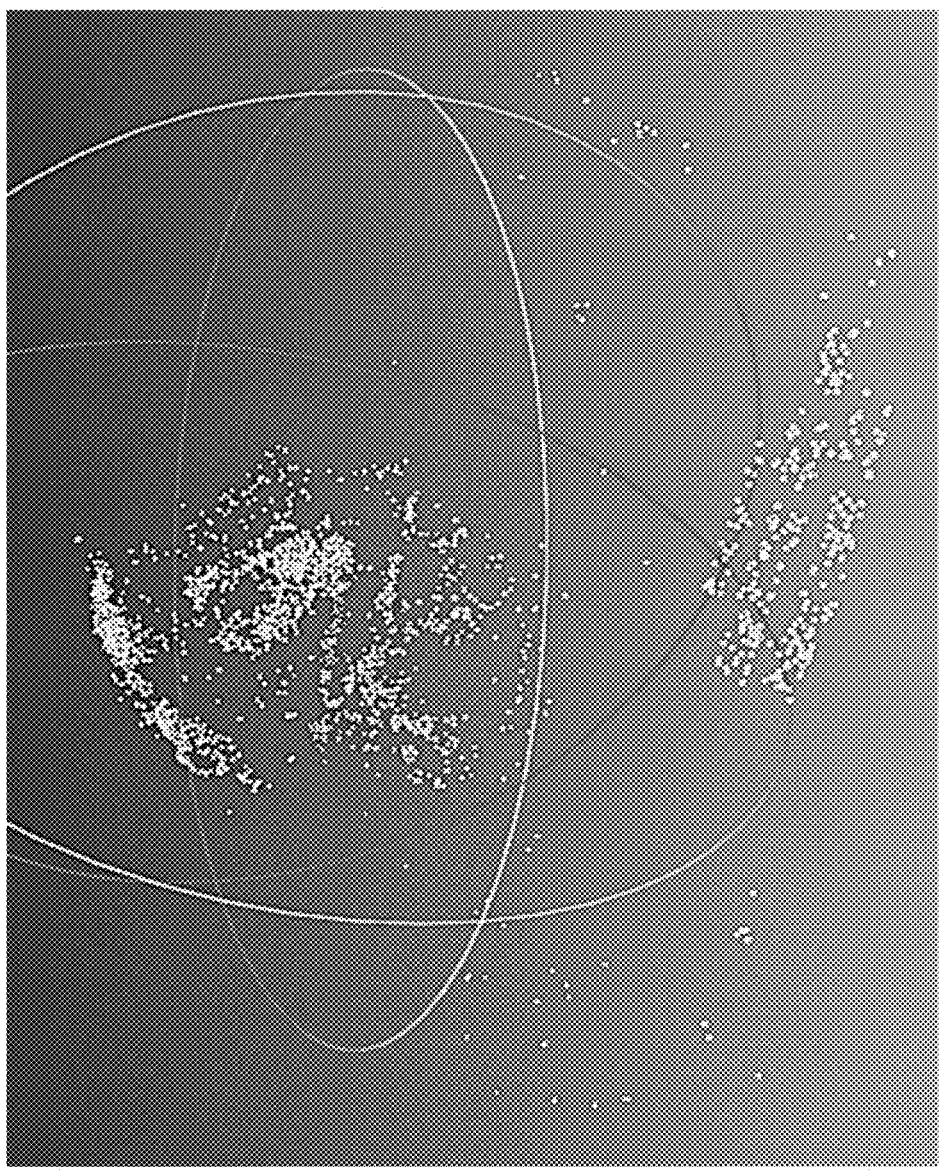
FIG. 7 depicts a final map generated from the first map, the second map, and the third map.
Figure 8:
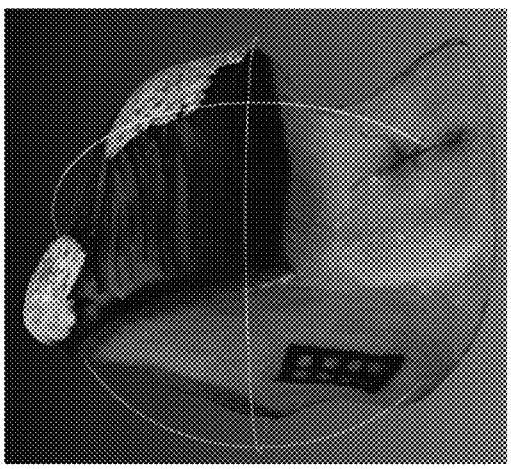
FIG. 8 depicts a plurality of views of a textured 3D mesh generated from the final map.
Figure 8:
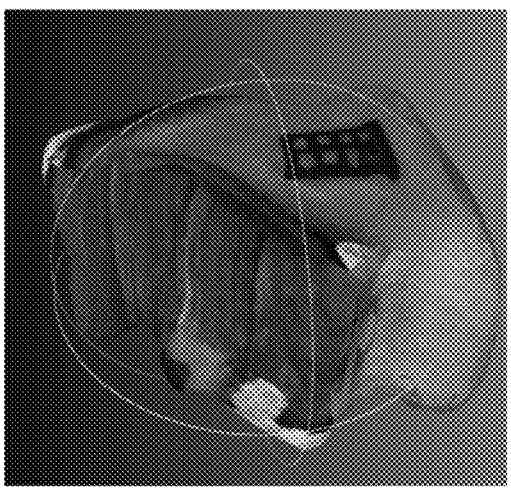
Figure 8:
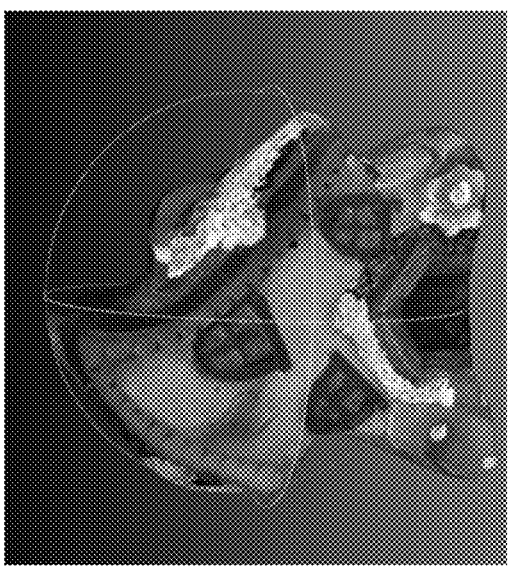

After finding the key point matches, the image processing module 106 performs (210) bundle adjustment on the first map, second map, and third map using the matched key points to generate a final map. FIG. 7 depicts the final map after bundle adjustment—as shown, the final map covers the entire object 102. Bundle adjustment optimizes key frame poses and 3D key points as a non-negligible step. In some embodiments, the bundle adjustment is solved by employing the Levenberg-Marquardt minimization Using all of the key points in the final map, the image processing module 106 then generates (212) a 3D point cloud of the object 102. Then, the image processing module 106 can utilize a Poisson algorithm to construct a 3D mesh on the 3D point cloud, and textures are applied to the 3D mesh (as created from the RGB images of the object received from the sensor device 103) to generate a 3D model of the object. In some embodiments, the module 106 generates the 3D mesh using a Marching Cube algorithm, and the texture is then added using, e.g., the open-source MVS module. FIG. 8 shows the textured 3D mesh from three different angles.

In the example described above, it should be appreciated that, during scanning, the object 102 does not move relative to its surroundings—only the sensor device 103 is moving. Due to this limitation, it is not possible to scan the bottom of the object 102. However, the multi-map-based method described herein can overcome this limitation as described below.

Figure 9:
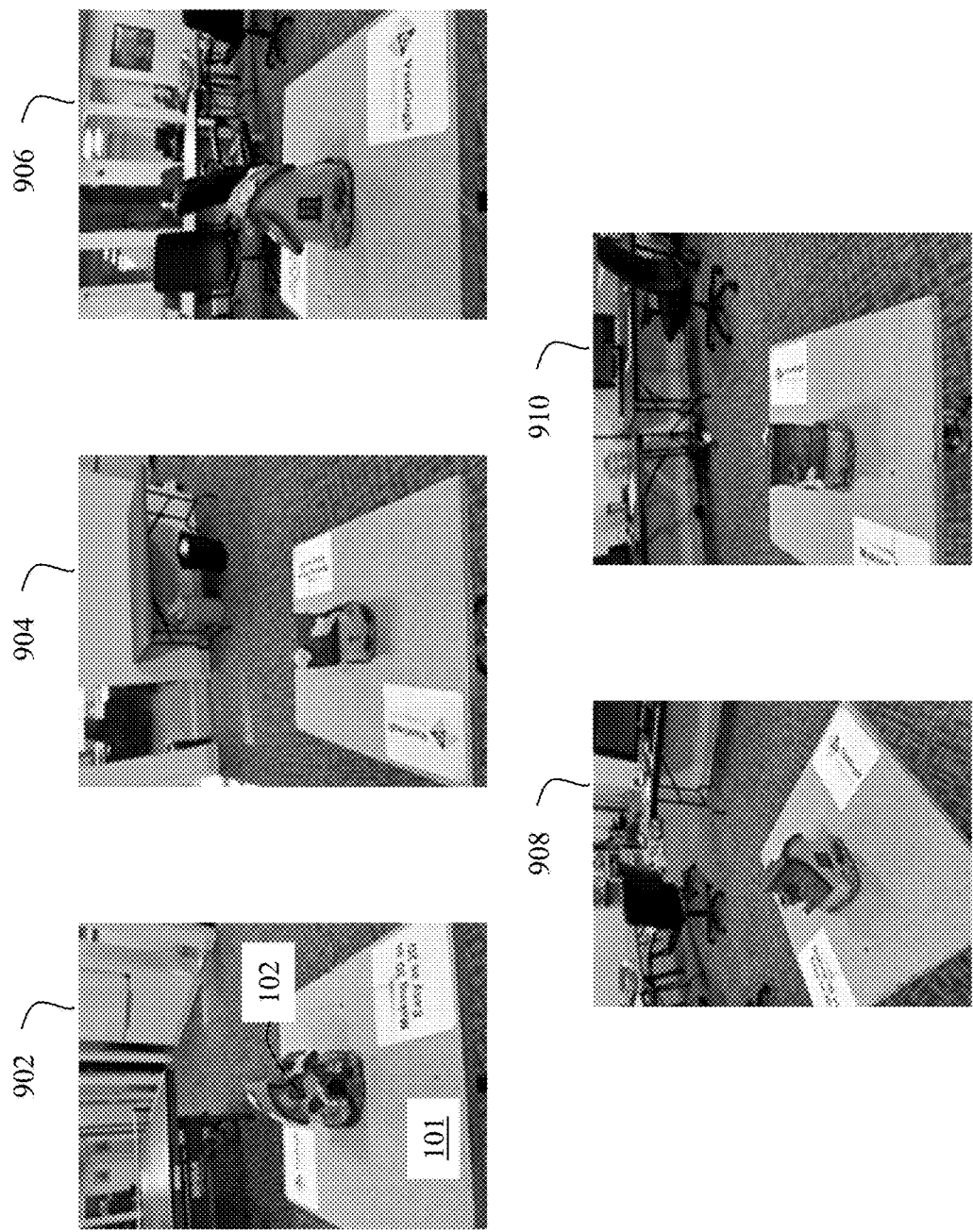
FIG. 9 depicts a plurality of scans of an object in a scene from different angles and perspectives where only the sensor device moves in relation to the object.
Figure 10:
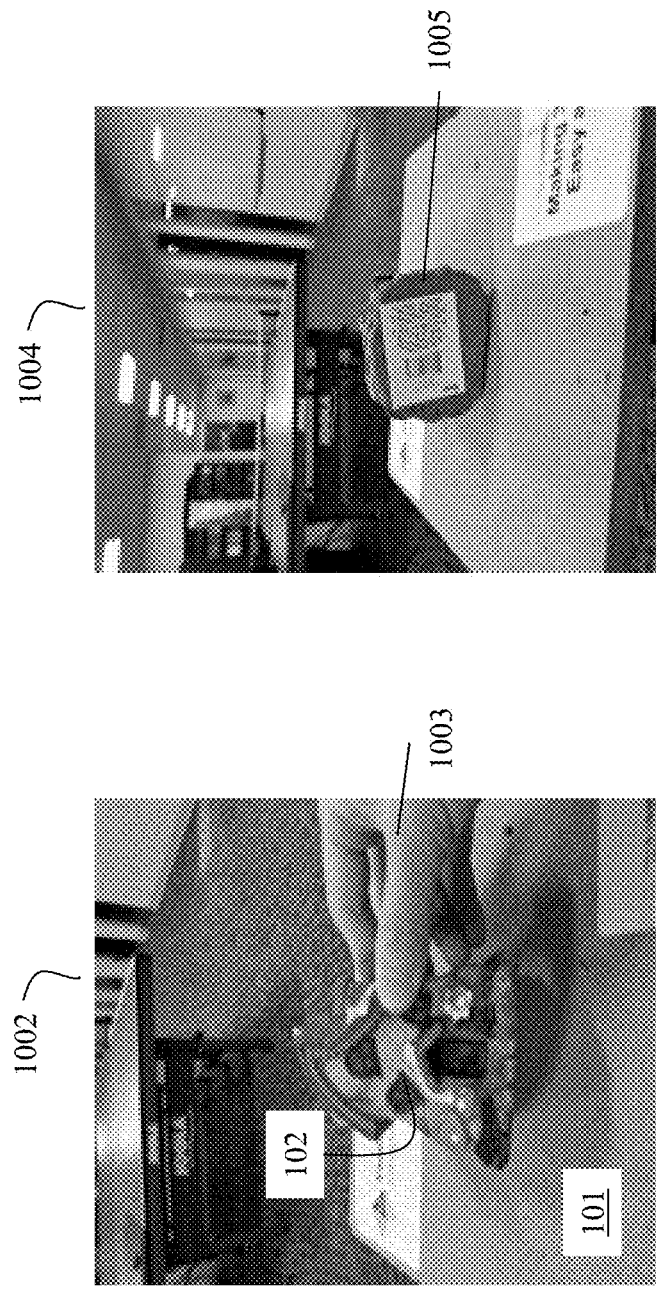
FIG. 10 depicts plurality of scans of an object in a scene from different angles and perspectives where the object is manually moved.

The scanning process can be separated into different modes including non-movement and movement of the object (i.e., relative to the scene). As shown in FIG. 9, the sensor device 103 can capture a plurality of scans 902-910 of the object 102 without any movement of the object. Also, as shown in FIG. 10, the sensor device 103 can capture a plurality of scans 1002-1004 of the object 102 as the object is being moved (e.g., by a user)—the user's hand 1003 is visible in one scan, while the bottom 1005 of the object is visible in another scan. To generate the 3D model without any holes or features that are not part of the object, the image processing module 106 uses the Dynamic SLAM technique (as described in as described in U.S. Pat. No. 9,715,761, titled "Real-Time 3D Computer Vision Processing Engine for Object Recognition, Reconstruction, and Analysis," and as described in U.S. patent application Ser. No. 14/849,172, titled "Real-Time Dynamic Three-Dimensional Adaptive Object Recognition and Model Reconstruction," both of which are incorporated herein in their entirety) which allows the object to move relative to its surroundings (i.e., the scene 101) while also extracting the hand that is holding the object 102.

Figure 11:
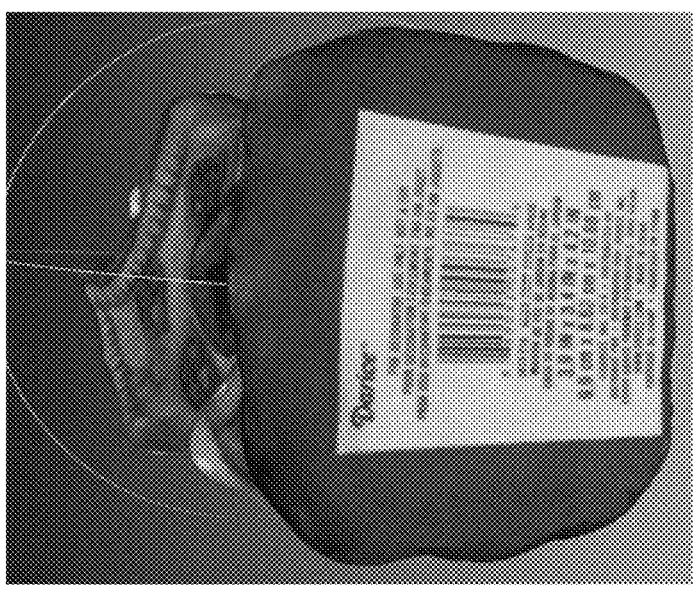
FIG. 11 depicts a plurality of views of a textured 3D mesh generated from a final map created using a static map and a dynamic map.
Figure 11:
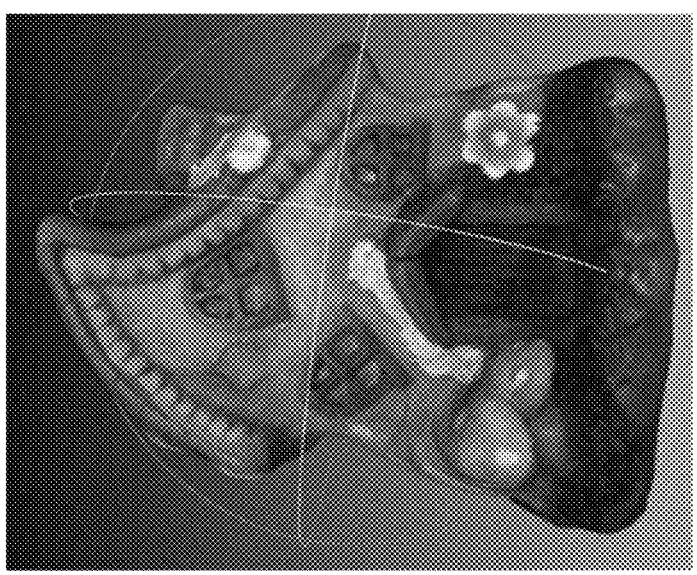

The image processing module 106 generates two independent maps using the above scans—one map that comprises key points from the scans 902-910 of the object 102 without movement (i.e., static scanning) and another map that comprises key points from the scans 1002-1004 of the object 102 with manual movement (i.e., dynamic scanning). As described previously, the image processing module 106 can then find key point matches between the static map and the dynamic map and perform bundle adjustment on the static map and dynamic map using the matched key points to generate a final map. Then, the image processing module 106 can generate a 3D mesh of the object from the final map and apply textures using the RGB images to create a 3D object. As shown in FIG. 11, the textured 3D mesh generated by the image processing module 106 includes the bottom of the object.

The techniques described herein also address the problem of disjointed maps. Disjointed maps can occur when new maps are created due to tracking loss during scanning. For example, when tracking is lost, the tracking algorithm no longer knows where the object 102 is in relation to the previous map, so the new map exists in a different coordinate system. Over the course of a complete scan, this can lead to several sub-maps within the multi-map that have no connection to each other. In order to fully reconstruct the object in 3D space, these sub-maps must be combined into one map by finding overlapping areas between them. However, this overlap may not occur until scanning is completed, so a final combining step must be performed before bundle adjusting the entire model.

Figure 12:
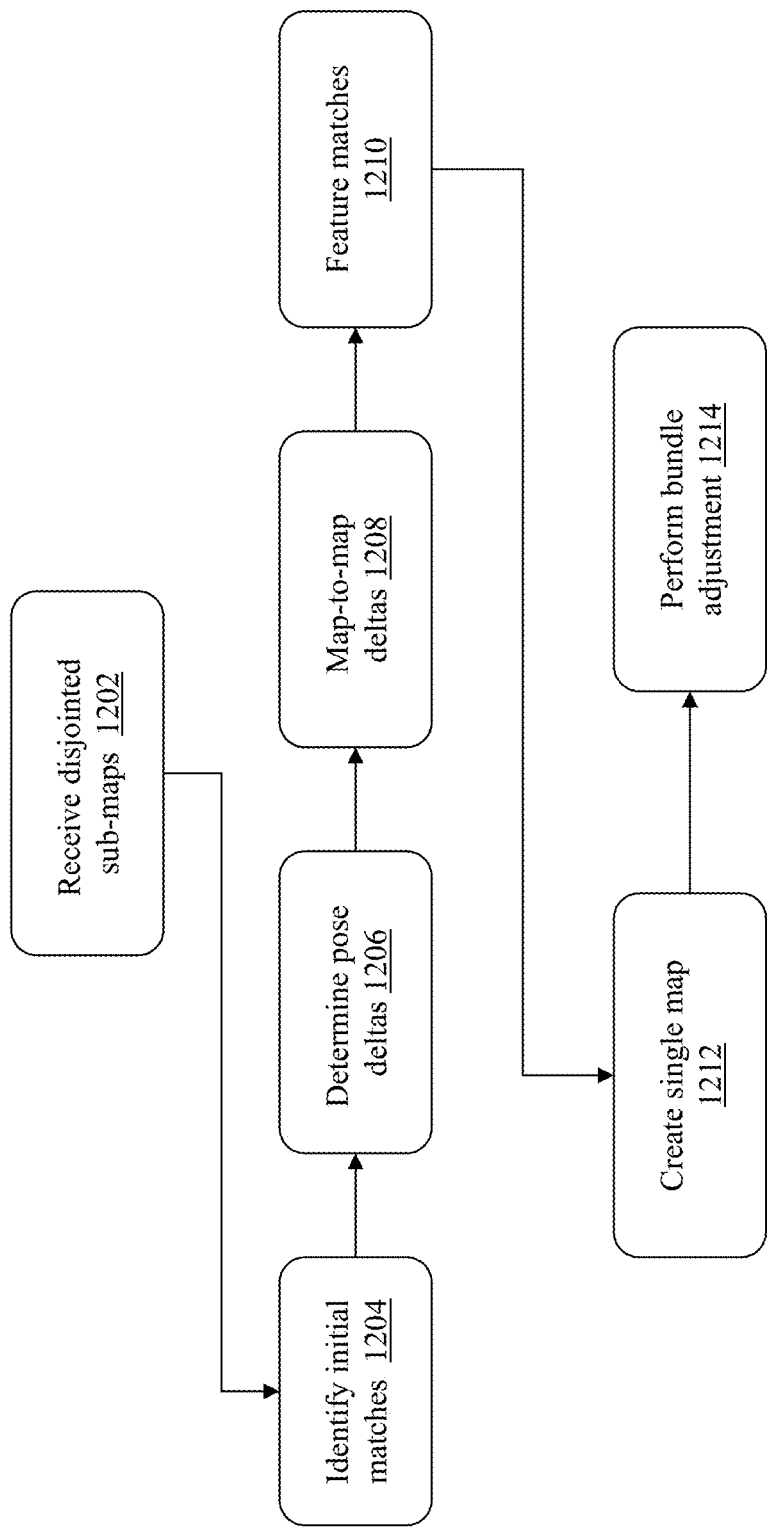
FIG. 12 is flow diagram of a computerized method of aligning disjointed sub-maps into a single map, using the system of FIG. 1.

FIG. 12 is a flow diagram of a computerized method 1200 of aligning disjointed sub-maps into a single map, using the system 100 of FIG. 1. The image processing module 106 receives (1202) a plurality of disjointed sub-maps during scanning, each sub-map comprising a set of keyframes. It should be appreciated that there are correspondences between keyframes within a single sub-map, but none between two different sub-maps. To align the disjointed sub-maps, the module 106 must find poses that align keyframes from each sub-map to keyframes in other sub-maps.

The image processing module 106 identifies (1204) initial matches of keyframes between different sub-maps. In one embodiment, the module 106 uses ORB feature descriptors found in each keyframe to create a bag-of-words histogram for the keyframe. The module 106 then compares histograms of different keyframes to find a pair of keyframes with a high potential to match correctly. If the histograms are similar, the module 106 then searches for ORB features with matches in both of the two keyframes. If the module 106 finds a large number of ORB features that match and agree on a pose transformation, then the module 106 considers these two keyframes matched. Using this technique, the module 106 can look for keyframe matches between any pair of keyframes from different sub-maps.

The image processing module 106 then determines (1206) pose deltas (or pose transformations) from the viewing angle of one keyframe to the other keyframe using the ORB feature matches between the two keyframes. The module 106 combines the original poses of the keyframes in their respective coordinate systems with the determined delta or transformation to find the transformation between coordinate systems. For example, given frame A with pose $P_A$ in the first map's coordinate system $C_A$ and frame B with pose $P_A$ in the first map's coordinate system $C_A$, the module 106 first finds the delta pose $P_{AB}$ transforming points in A to points in B. The module 106 can then express the transformation between coordinate systems as $C_B = P_B P_{AB} P_A^{-1} C_A$.

Now, the image processing module 106 has a number of possible transformations from one map to another, one per keyframe pair. The module 106 determines (1208) map-to-map deltas by identifying the number of inliers in each possible transformation, where the transformation with the largest number of inliers then describes the most likely alignment between two maps. The module 106 takes the two maps with the largest number of inliers and combines them into one map by inserting all key points and key frames into a single map after transforming them into the shared coordinate system. The module 106 then repeats this procedure until all of the maps have been combined into one coordinate system.

The image processing module 106 then performs (1210) feature matching on the keyframes. Because all keyframes from all maps are now in the same coordinate system, the module 106 can easily search for good feature-to-feature correspondences in any pair of overlapping keyframes. These correspondences tie all keyframes together into one map that can be bundle adjusted.

Then, the image processing module 106 can perform (1212) bundle adjustment on the new map. It should be appreciated that global bundle adjustment takes place the same way it would when there is only a single map, reducing any error in the sub-map to sub-map pose estimation.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A system for generating multiple maps during object scanning for 3D object reconstruction, the system comprising:
   a sensor device that captures one or more RGB images and one or more depth maps of one or more objects in a scene;
   a computing device coupled to the sensor device, the computing device comprising a memory that stores computer-executable instructions and a processor that executes the instructions to:
      receive the one or more RGB images and the one or more depth maps from the sensor device;
      create a first map using at least a portion of the one or more depth maps comprising a view of the one or more objects from a first perspective, wherein, for each depth map, the computing device:
         locates at least one of the one or more objects in the depth map, identifies one or more key points on the located one or more objects, and combines the identified key points to generate the first map;
      create a second map using at least a portion of the one or more depth maps, comprising a view of the one or more objects from a second perspective different from the first perspective, wherein, for each depth map, the computing device:
         locates at least one of the one or more objects in the depth map, identifies one or more key points on the located one or more objects, and combines the identified key points to generate the second map;
      create a third map using at least a portion of the one or more depth maps comprising a view of the one or more objects from a third perspective, wherein, for each depth map, the computing device:
         locates at least one of the one or more objects in the depth map, identifies one or more key points on the located one or more objects, and combines the identified key points to generate the third map; and
      wherein at least one of the identified key points in the first map overlaps with at least one of the identified key points in the third map;
      find key point matches among the first map, the second map, and the third map;
      perform bundle adjustment on the first map, the second map, and the third map using the matched key points to generate a final map; and
      generate a 3D mesh of the object using the final map.

2. The system of claim 1, wherein at least one of the identified key points in the second map overlaps with at least one of the identified key points in the third map.

3. The system of claim 2, wherein at least one of the identified key points in the first map overlaps with at least one of the identified key points in the second map.

4. The system of claim 3, wherein finding key point matches among the first map, the second map, and the third map comprises one or more of:
   determining that a key point from the first map overlaps with a key point from the second map and identifying the overlapping key points as a key point match;
   determining that a key point from the second map overlaps with a key point from the third map and identifying the overlapping key points as a key point match; and
   determining that a key point from the first map overlaps with a key point from the third map and identifying the overlapping key points as a key point match.

5. The system of claim 4, wherein the final map comprises a plurality of bundle-adjusted matched key points from the first map, the second map, and the third map.

6. The system of claim 1, wherein the 3D mesh is generated using a Marching Cube algorithm applied to at least a portion of the final map.

7. The system of claim 1, wherein the one or more objects in the scene are stationary and the sensor device is moving, as the sensor device captures the one or more RGB images and the one or more depth maps.

8. The system of claim 1, wherein the one or more objects in the scene are moving and the sensor device is stationary, as the sensor device captures the one or more RGB images and the one or more depth maps.

9. The system of claim 1, wherein the one or more objects in the scene are moving and the sensor device is moving, as the sensor device captures the one or more RGB images and the one or more depth maps.

10. A computerized method of generating multiple maps during object scanning for 3D object reconstruction, the method comprising:
   capturing, by a sensor device, one or more RGB images and one or more depth maps of one or more objects in a scene;
   receiving, by a computing device from the sensor device, the one or more RGB images and the one or more depth maps;
   creating, by the computing device, a first map using at least a portion of the one or more depth maps comprising a view of the one or more objects from a first perspective, wherein, for each depth map, the computing device:
      locates at least one of the one or more objects in the depth map, identifies one or more key points on the located one or more objects, and combines the identified key points to generate the first map;
   creating, by the computing device, a second map using at least a portion of the one or more depth maps comprising a view of the one or more objects from a second perspective different from the first perspective, wherein, for each depth map, the computing device:
      locates at least one of the one or more objects in the depth map, identifies one or more key points on the located one or more objects, and combines the identified key points to generate the second map;
   creating, by the computing device, a third map using at least a portion of the one or more depth maps comprising a view of the one or more objects from a third perspective, wherein, for each depth map, the computing device:
      locates at least one of the one or more objects in the depth map, identifies one or more key points on the located one or more objects, and combines the identified key points to generate the third map; and
   wherein at least one of the identified key points in the first map overlaps with at least one of the identified key points in the third map;
   finding, by the computing device, key point matches among the first map, the second map, and the third map;
   performing, by the computing device, bundle adjustment on the first map, the second map, and the third map using the matched key points to generate a final map; and
   generating, by the computing device, a 3D mesh of the object using the final map.

11. The method of claim 10, wherein at least one of the identified key points in the second map overlaps with at least one of the identified key points in the third map.

12. The method of claim 11, wherein at least one of the identified key points in the first map overlaps with at least one of the identified key points in the second map.

13. The method of claim 12, wherein finding key point matches among the first map, the second map, and the third map comprises one or more of:
   determining that a key point from the first map overlaps with a key point from the second map and identifying the overlapping key points as a key point match;
   determining that a key point from the second map overlaps with a key point from the third map and identifying the overlapping key points as a key point match; and
   determining that a key point from the first map overlaps with a key point from the third map and identifying the overlapping key points as a key point match.

14. The method of claim 13, wherein the final map comprises a plurality of bundle-adjusted matched key points from the first map, the second map, and the third map.

15. The method of claim 10, wherein the 3D mesh is generated using a Marching Cube algorithm applied to at least a portion of the final map.

16. The method of claim 10, wherein the one or more objects in the scene are stationary and the sensor device is moving, as the sensor device captures the one or more RGB images and the one or more depth maps.

17. The method of claim 10, wherein the one or more objects in the scene are moving and the sensor device is stationary, as the sensor device captures the one or more RGB images and the one or more depth maps.

18. The method of claim 10, wherein the one or more objects in the scene are moving and the sensor device is moving, as the sensor device captures the one or more RGB images and the one or more depth maps.

* * * * *